US006871162B2

(12) United States Patent
Futamura et al.

(10) Patent No.: US 6,871,162 B2
(45) Date of Patent: *Mar. 22, 2005

(54) NON-ITERATIVE METHOD FOR A FULLY-COUPLED THERMOMECHANICAL ANALYSIS OF A TIRE AND ESTIMATING EFFECTS OF COMPOUND CHANGES ON TIRE TEMPERATURE DISTRIBUTION USING THE DEFORMATION INDEX

(75) Inventors: Shingo Futamura, Wadsworth, OH (US); Arthur Allen Goldstein, Mayfield Village, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 37 days.

This patent is subject to a terminal disclaimer.

(21) Appl. No.: 10/263,434

(22) Filed: Oct. 2, 2002

(65) Prior Publication Data

US 2004/0068391 A1 Apr. 8, 2004

(51) Int. Cl.[7] .............................................. G06F 11/30
(52) U.S. Cl. ........................... 702/183; 702/33; 702/42; 702/98; 702/130; 702/183; 700/28; 700/38; 700/52; 73/789; 73/760; 152/4; 152/5; 152/50
(58) Field of Search ...................... 702/33, 42, 98–100, 702/130, 183; 700/28, 38, 52; 73/789, 760; 152/4, 5, 50

(56) References Cited

U.S. PATENT DOCUMENTS

| | | | | |
|---|---|---|---|---|
| 3,934,452 A | * | 1/1976 | Prevorsek et al. | 374/47 |
| 4,150,567 A | * | 4/1979 | Prevorsek et al. | 73/146 |
| 5,327,358 A | * | 7/1994 | Stubbs | 702/36 |
| 5,343,916 A | * | 9/1994 | Duddey et al. | 152/5 |
| 6,631,647 B2 | * | 10/2003 | Seale | 73/789 |

OTHER PUBLICATIONS

Followell et al., 'Computer–Aided Reliability Finite Element Methods', Jan. 1991, IEEE, pp. 214–221.*
Govindjee, 'Firestone Tire Failure Analysis', Jan. 30, 2001, Firestone, pp. 1–73.*
Whicker, D., Browne, A. L., Segalman, D. J., and Wickliffe, L. E., "Thermomechanical Approach to Tire Power Loss Modeling", Tire Science & Technology, 3, vol. 9, No. 1, 1981.
Yavari, B., Tworzydlo, W. W., and Bass, J. M., "Thermomechanical Model to Predict the Temperature Distribution of Steady State Rolling TIres," Tire Science & Technology, 163, vol. 21, No. 3, 1993.

(List continued on next page.)

*Primary Examiner*—Patrick Assouad
*Assistant Examiner*—Elias Desta
(74) *Attorney, Agent, or Firm*—Howard M. Cohn

(57) ABSTRACT

A simple method of handling thermomechanical coupling for temperature computation in a rolling tire. First, the sensitivity of the tire elastic response to changes in material stiffness is characterized using the "deformation index". Then, using a commercial finite element program and an appropriate user subroutine, heat generation is expressed as a function of the local temperature using a simple algebraic expression involving the temperature dependent material properties and the deformation indices. Temperatures are computed using the finite element program with the coupling information contained in the user subroutine. The result is a non-iterative method for a fully-coupled thermomechanical analysis of a tire. The effects of compound changes on tire temperature distribution can also be estimated using the deformation index. The method applies to the energy loss and temperature calculations under both steady-state and transient conditions.

18 Claims, 10 Drawing Sheets

OTHER PUBLICATIONS

Futamura, S., "Deformation Index Concept for Hysteretic Energy Loss Process", Rubber Chemistry & Technology, 57, vol. 64, No. 1, 1991.

Ebbott, T. G., Hohman, R. L., Jeusette, J.–P., Kerchman, V., "Tire Temperature and Rolling Resistance Prediction with Finit Element Analysis," Tire Science and Technology, 2, vol. 27, No. 1, 1999.

Willet, P. R., "Hysteretic Losses in Rolling Tires," Rubber Chemsitry & Technology, 425, vol. 46, 1973.

Mouri, H., "A New Flexometer to Predict Heat Generation in Truck TIres," ACS Rubber Division Cleveland Meeting, Paper #98, 1995.

Uemura, Y. and Y. Saito, "Reduction of Rolling Resistance Under High Inflation Pressure—Electric Vehicle Tyre," German Rubber Conference, Stuttgart, Jun. 1994.

Ferry, John D. "Viscoelastic Properties of Polymers" John Wiley & Sons, Inc. New York, 1980.

Futamura, S., "Effect of Material Properties on Tire Performance Characteristics. Part II– Tread Material" Tire Science & Technology, 2, vol. 18, No. 1, 1990.

\* cited by examiner

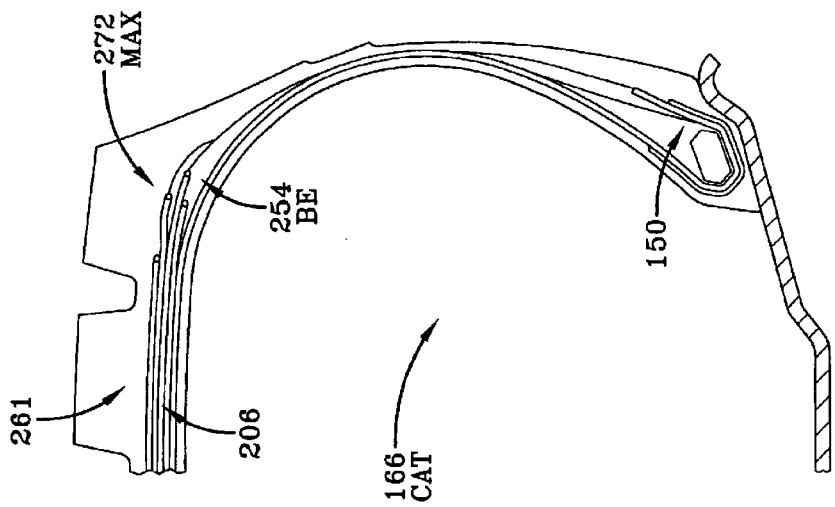
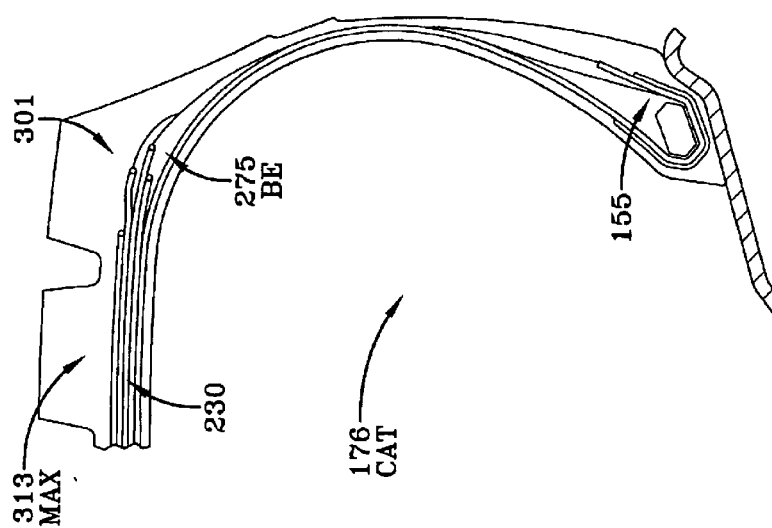

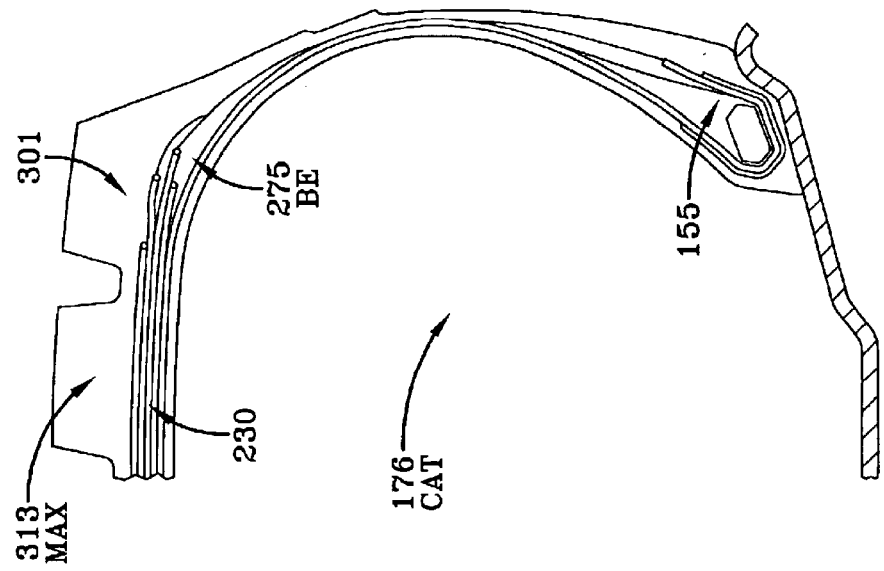
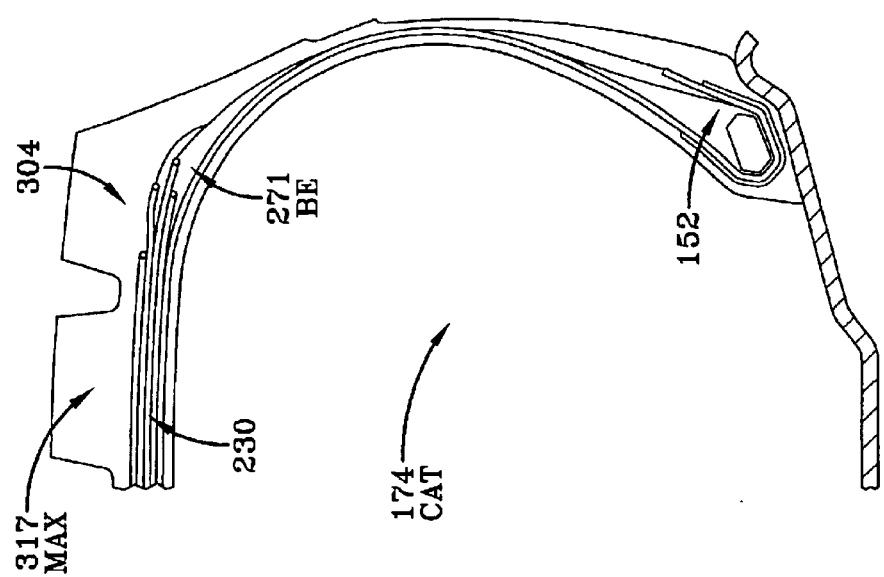

NON-ITERATIVE METHOD FOR A FULLY-COUPLED THERMOMECHANICAL ANALYSIS OF A TIRE AND ESTIMATING EFFECTS OF COMPOUND CHANGES ON TIRE TEMPERATURE DISTRIBUTION USING THE DEFORMATION INDEX

TECHNICAL FIELD OF THE INVENTION

The invention relates to the design of pneumatic tires, and more particularly to analyzing the thermomechanical properties of a rolling tire.

BACKGROUND OF THE INVENTION

Determination of the energy loss and the operating temperatures of a tire is extremely important when considering tire durability. However, the thermomechanical analysis of a rolling tire is a highly complex process due to the effects of temperature on both the mechanical state and the viscoelastic energy dissipation in the tire. (It should be understood that it is not the physical tire itself that is analyzed, but rather the design of the tire, such as would be represented on a CAD/CAM system.). Thus, the computation of the tire temperature field, especially when considering transient heat build-up, is complicated by the temperature dependence of elastic and viscoelastic material properties (thermomechanical coupling).

Modeling the coupled thermomechanical behavior of a steady state rolling tire typically requires that the deformation, energy dissipation, and temperature be determined iteratively. As a result, a steady-state analysis involves updating the temperature dependent elastic and viscoelastic properties as the solution proceeds. The computation usually involves three modules: a deformation module, a dissipation module, and a thermal module. The process is further complicated in a transient analysis where temperature dependent material properties need to be updated at multiple intervals in time.

An iterative process employing finite element analysis (FEA) for updating the material properties for calculating steady state temperatures for a rolling pneumatic tire is described below, and involves an "inner loop" (energy dissipation) computation that iteratively updates the rubber loss modulus G" for temperature and an "outer loop" (structural loop) computation that updates the storage modulus G' for temperature. This process would be repeated at regular time intervals in a transient thermal analysis, resulting in a high degree of computation complexity.

FIG. 1 illustrates a prior art technique for analyzing coupled heat generation. The technique is based on the process discussed by researchers at General Motors, as discussed in Whicker, et al. *"Thermomechanical Approach to Tire Power Loss Modeling", Tire Science & Technology*, 3, Vol. 9, No. 1, 1981.

The overall process 100 includes three "modules"—a structural analysis module 102, an energy dissipation module 104, and a thermal analysis module 106. The structural analysis module 102 and the thermal analysis module 106 are typically based on commercial finite element analysis (FEA) software, such as ABAQUS. ABAQUS is a well-known suite of general-purpose, nonlinear finite element analysis (FEA) programs, which is used for stress, heat transfer, and other types of analysis in mechanical, structural, civil, biomedical, and related engineering applications. The energy dissipation (EDISS) module 104 is suitably based on software discussed in Ebbott, et al., *"Tire Temperature and Rolling Resistance Prediction with Finite Element Analysis," Tire Science and Technology*, 2, Vol. 27, No. 1, 1999.

Assuming that a fully-coupled analysis is to be performed, the analysis starts with the ABAQUS structural tire model 102, where elastic material properties are defined as a function of temperature. Temperatures are initialized and the tire is inflated and load deflected, resulting in a set of element strains ($\gamma$).

The strains are transferred to the energy dissipation module (EDISS program) 104. Within the energy dissipation module 104, the loss modulus G" is also defined as a function of temperature. The temperature is initially set to a constant value. The energy dissipation module 104 calculates energy dissipation for each ring of elements, as well as total energy loss and the resulting tire rolling resistance force. A set of element heat fluxes corresponding to each ring of elements is produced.

In order to obtain tire temperatures, the ABAQUS axisymmetric thermal model 106 is run. The model reads the heat fluxes computed from the energy dissipation module 104, applies appropriate thermal boundary conditions, and computes the tire temperature profile. Completion of this step is considered the end of a typical "uncoupled" open loop analysis.

For further solution refinement a "partially coupled" calculation is used, where the current temperatures (T) output by the thermal analysis module 106 are recycled (looped back) 108 into the energy dissipation module 104 to update the loss modulus (G"). New heat fluxes are calculated, which are then passed to the thermal analysis module 104 for new temperatures, and so on. This process is termed the "energy dissipation" loop—alternatively, the "inner loop". The energy dissipation loop (104, 106, 108) ends (is "converged") when two successive temperature calculations ($T_n$, $T_{n+1}$) are within a specified "inner" loop temperature tolerance ($\Delta T_i$), which typically requires fewer than ten energy dissipation loop cycles.

Still further solution refinement may be obtained by using a "structural loop" calculation—alternatively termed the "outer loop". Here, the temperatures from the last converged energy dissipation (inner) loop cycle are re-applied via 110 to the ABAQUS structural analysis module 102 to update the elastic properties for the new temperatures. The process proceeds once again through another energy dissipation loop cycle 108, and so on. The structural loop 110 ends (is converged) when two successive temperature calculations ($T_m$, $T_{m+1}$) are within a specified "outer loop" temperature tolerance ($\Delta T_o$), which typically requires about three structural loop cycles.

The "inner loop" computation is readily automated. Since the inner loop involves only EDISS and the ABAQUS thermal wedge model, this phase of the computation is relatively fast. However, for each outer loop cycle, the structural analysis must be rerun with updated elastic properties. This phase of the analysis is computationally slow. Adapting the procedure to transient analyses would potentially require inner and outer loop computations at multiple time steps, increasing the computation time even further.

The method described with respect to FIG. 1 is iterative, and therefore takes time to converge, even more so as the number of discrete elements in the FEA structural analysis is increased.

SUMMARY OF THE INVENTION

A general object of the invention is to provide a simplified, non-iterative method of handling the coupled thermomechanical analysis of a tire.

Another object is to provide a technique for estimating effects of compound changes on tire temperature distribution.

According to the invention, a method for performing a thermomechanical analysis of a tire design, comprises:

creating a finite element analysis model of the tire having a plurality of elements, the elements of the model comprising a tire compound (TC) having elastic material properties (G') and loss moduli (G");

performing a baseline run, comprising performing a structural analysis of the elements using baseline elastic material properties ($G'_0$), performing an energy dissipation analysis using baseline loss moduli ($G''_0$), calculating energy dissipated per unit volume of the element per cycle ($Q_0$);

performing a perturbation run, comprising performing the structural analysis of the elements using perturbation elastic material properties ($G'_1$), performing the energy dissipation analysis using perturbation loss moduli ($G''_1$), calculating energy dissipated per unit volume of the element per cycle ($Q_1$); and calculating deformation indices (m) by the following equation:

$$m = \frac{\log(Q_1/Q_0) - \log(G''_1/G''_0)}{\log(G'_1/G'_0)} + 1;$$

performing a thermal analysis run while updating the element heat flux in the tire thermal model according to the following equation:

$$\dot{Q}_t = \dot{Q}_{t0}\left(\frac{G'_t}{G'_{t0}}\right)^{m-1}\frac{G''_t}{G''_{t0}}$$

where, $\dot{Q}_t$=Element heat flux at temperature t $\dot{Q}_{t0}$=Element heat flux at reference temperature $t_0$ $G'_t$, $G''_t$=Storage and loss moduli at temperature t $G'_{t0}$, $G''_{t0}$=Storage and loss moduli at temperature $t_0$ m Deformation index Also according to the invention, the method further comprises analyzing steady state and transient temperature in a running tire.

Still further, according to the invention, the method further comprises analyzing steady state and transient rolling loss in a running tire.

Further, according to the invention, the elastic material properties (G') are shear storage moduli.

Still further, according to the invention, the perturbation run, the tire compounds are stiffened by a small amount.

Further, according to the invention, the perturbation run, the tire compounds are stiffened by at least 10 percent.

Also according to the invention, the method further comprises deriving temperatures for the elements from the deformation indices of the elements.

According to the invention, the method further comprises deriving temperatures for the elements from material properties, heat fluxes and time-temperature shifting constants. The method further evaluates the impact of a tire compound change on tire running temperatures.

Still further, according to the invention, the method is used to evaluate the impact of a tire compound change on tire running temperatures, without re-running the tire structural analysis.

According to another aspect of the invention, a method for a thermomechanical analysis of a tire comprises:

characterizing the sensitivity of the tire elastic response to changes in material stiffness is characterized using a deformation index m;

using the heat flux and material properties corresponding to a solution at a reference temperature, calculating a new heat flux using the deformation index according to the following equation:

$$\dot{Q} = \dot{Q}_{t0}\left(\frac{G'_t}{G'_{t0}}\right)^m \frac{(\tan\delta)_t}{(\tan\delta)_{t0}}$$

where, $Q_{t0}$=Element body (heat) flux at reference temperature $t_0$ $G'_t$=Storage moduli at temperature t $G'_{t0}$=Storage moduli at temperature $t_0$ $(\tan \delta)_t = G''_t/G'_t$ at temperature t $(\tan \delta)_{t0} = G''_{t0}/G'_{t0}$ at temperature $t_0$ According to the another aspect of the invention, the method further comprises obtaining average component deformation indices for a tire of interest at a required inflation and load;

from the baseline thermal analysis, identifying the top component contributors to energy loss;

from the corresponding deformation indices, determining if the components are primarily under stress, strain or energy control;

selecting an alternate material, as follows:

if stress control, decrease tan δ/G' if energy control, decrease tan δ if strain control, decrease G"

computing the thermomechanically coupled energy loss rate with the alternate material, using the equation; and summing the total energy loss rate over all components to compute improvement in rolling resistance (RR).

According to the another aspect of the invention, the method further comprises:

creating a finite element analysis model of the tire having a plurality of elements, the elements of the model comprising a tire compound (TC) having elastic material properties (G') and loss moduli (G");

performing a baseline run, comprising performing a structural analysis of the elements using baseline elastic material properties ($G'_0$), calculating energy dissipated per unit volume of the element per cycle ($Q_0$);

performing a perturbation run, comprising performing the structural analysis of the elements using perturbation elastic material properties ($G'_1$), performing the energy dissipation analysis using perturbation loss moduli ($G''_1$), calculating energy dissipated per unit volume of the element per cycle ($Q_1$); and calculating deformation indices (m) for the element as a function of at least one of:

the ratios of the energy dissipations (Q) for the baseline and perturbation runs; and the ratios of elastic material properties (G') for the baseline and perturbation runs.

According to the another aspect of the invention, the elastic material properties (G') are shear storage moduli.

Still further according to the another aspect of the invention, the perturbation run, the tire compounds are stiffened by a small amount. Preferably, the tire compounds are stiffened by at least 10 percent.

Also according to the another aspect of the invention, the method further comprises deriving temperatures for the elements from the deformation indices of the elements.

Still further according to the another aspect of the invention, the temperatures for the elements derive from material properties, heat fluxes and time-temperature shifting constants.

Further according to the another aspect of the invention, the method can be used to evaluate the impact of a tire compound change on tire running temperatures.

Other objects, features and advantages of the invention will become apparent in light of the following description thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

The structure, operation, and advantages of the present preferred embodiment of the invention will become further apparent upon consideration of the following description taken in conjunction with the accompanying figures, wherein:

FIG. 9 is a cross section of half a tire showing the differences in the tire temperatures for compound C;

FIG. 10 is a cross section of half a tire showing the differences in the tire temperatures for compound D;

FIG. 11 is a cross section of half a tire showing the differences in the tire temperatures using a full method for compound C;

FIG. 12 is a cross section of half a tire showing the differences in the tire temperatures using a prorating method for compound C;

DETAILED DESCRIPTION OF THE INVENTION

Figure 1:
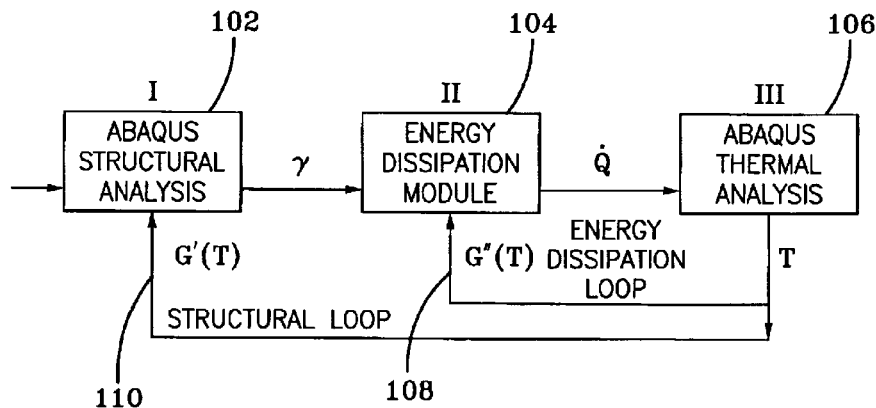
FIG. 1 is a flow chart of a technique for handling coupled heat generation analyses, according to the prior art.

According to the invention, the thermomechanical analysis of a tire is based on a "deformation index" concept. The deformation index, m, is a measure of the sensitivity of the cyclic strain energy (or cyclic energy dissipation) to changes in material stiffness. This sensitivity is related to the type of deformation a material point experiences in its duty cycle, namely the degree to which the material is stress controlled, strain controlled, or energy controlled. Knowing the deformation index allows the estimation of energy loss through the general relationship $Q \propto (G')^m \tan \delta$ where, Q=energy dissipated per unit volume G'=storage modulus in shear tan δ=loss factor m=deformation index, and ranges continuously between −1 (stress control) and +1 (strain control). An m value of zero indicates energy control.

Background for Deformation Index Concept

Under a sinusoidal cyclic deformation of a viscoelastic material the energy loss, Q, per cycle is given by the equation (1):

$$Q = \int_0^T \tau \dot{\gamma} dt = \pi \tau_0 \gamma_0 \sin \delta \qquad (1)$$

where $\tau_0$ is stress amplitude, $\gamma_0$ is strain amplitude, T is the period of the cycle, and δ is the phase difference between stress and strain.

Since $\tau_0 = G^* \gamma_0$, and $\sin \delta = G''/G^*$ equation (1) can also be written as (2):

$$Q = \pi \gamma_0^2 G'' = \pi \tau_0^2 J'' \qquad (2)$$

where $G^*$ and $G''$ are the complex modulus and loss modulus, respectively, and $J'' = G''/(G^*)^2$ is the loss compliance. Equations (1) and (2) indicate that, depending on the type of deformation, namely a controlled strain cycle $\gamma = \gamma_0 \sin t$, a controlled stress cycle $\tau = \tau_0 \sin \omega t$, or a controlled energy cycle $Q = \tau_0 \gamma_0$, the energy loss per cycle is proportional to different viscoelastic properties, namely, $G''$, $J''$, or sin δ respectively.

However, in reality, the type of deformation is not purely a constant strain, constant stress, or constant energy process. Most likely, the process is a mixture of these deformations. Thus, the "Deformation Index" concept can be described by the following equation (3).

$$Q \propto G''/(G^*)^n \qquad (3)$$

where n is the deformation index with any value ranging between 0 and 2. Values of n=0, 1, and 2 represent special cases of exact deformations of controlled strain, controlled energy, and controlled stress cycle deformation processes, respectively. For the case where sin δ and $G^*$ are approximated by tan δ and G', respectively, the deformation index can also be expressed in terms of G' and tan δ as described by the following equation (4).

$$Q \propto (G')^m \tan \delta \qquad (4)$$

In the above expression, the deformation index, m, ranges continuously between −1 (stress control) and +1 (strain control). A value of zero for the deformation index, m, indicates energy control. The deformation index can be determined experimentally by correlating the amount of energy loss, for example rolling resistance, to the viscoelastic energy loss function $G''/(G^*)^n$ or $(G')^m \tan \delta$ of a material and determining the value n or m where the correlation coefficient reaches the maximum value (in equation (3) or (4)).

The deformation index of a rolling tire can also be determined numerically using a finite element analysis (FEA) method. In this case the computation of the deformation index, m, in equation (4) is determined on an element (local) basis by making two structural/energy dissipation runs, namely a baseline run and a "perturbation" (or "variant") run. In the perturbation run, all rubber compounds are stiffened by a small amount, preferably at least 10 percent, typically 20 or 30 percent. Energy dissipation is typically computed from equation (4) while holding tan δ constant. The deformation index, m, may be calculated using the following equation (5):

$$m = \frac{\log\left(\frac{Q_1}{Q_0}\right)}{\log\left(\frac{G'_1}{G'_0}\right)} \tag{5}$$

where $G_0$ and $G'_1$ are shear storage moduli corresponding to the baseline and the perturbation runs, respectively. (For a neo-hookean analysis it can be assumed that the storage modulus G' is approximately equal to $2C_{10}$ which is a constant in the neo-hookean elasticity equation). The quantities $Q_0$ and $Q_1$ are element energy dissipations corresponding to baseline and perturbation runs, respectively. (It should be noted that for the 20 percent increase in stiffness, the denominator is equal to log 1.2). Equation (5) neglects "cross sensitivity" effects, namely changes in energy dissipation in neighboring elements when the stiffness of a target element is changed, but this assumption is generally valid. When tan δ is not held constant in energy dissipation calculation, the deformation index, m, is calculated by a general equation (5a).

$$m = \frac{\log(Q_1/Q_0) - \log(\tan\delta_1/\tan\delta_0)}{\log(G'_1/G'_0)} \tag{5a}$$

$$= \frac{\log(Q_1/Q_0) - \log(G''_1/G''_0)}{\log(G'_1/G'_0)} + 1$$

Because the deformation index is a measure of the type of deformation the index can be calculated, if desired, in terms of the changes in cyclic strain energy of elements. In this case, the storage moduli $G'_1$ and $G'_0$ used in structural run are also used in energy dissipation run to calculate cyclic strain energy in place of cyclic energy dissipation.

Deformation Index Method of Thermomechanical Analysis

Looking only at the thermal analysis, it can be observed that it is the change in heat flux that causes the temperatures to differ between the uncoupled, partially coupled, and fully-coupled computations. The heat flux is affected by the element strain cycle (as influenced by the storage modulus G') and the loss modulus G", which in turn are influenced by the temperature. Thus, if a relationship were to be established between the temperature, material properties, and resulting heat flux, computations could then be contained within the thermal analysis alone, eliminating the need for looping. Such a relationship can be obtained using the deformation index.

A computational link is established between element heat flux and temperature through the use of an ABAQUS user subroutine (DFLUX) in the thermal analysis. The user subroutine is provided with suitable expressions for G' and G" as functions of temperature. At any point in the solution new material properties ($G_t'$ and $G_t''$) are calculated to reflect the updated temperatures. By knowing the heat flux and material properties corresponding to a solution at a reference temperature $t_0$ (namely $Qdot_{t0}$, $G'_{t0}$, and $G''_{t0}$ respectively), a new heat flux can be calculated using the deformation index. From equation (4), above, it can thus be determined that (6):

$$\dot{Q} = \dot{Q}_{t0}\left(\frac{G'_t}{G'_{t0}}\right)^m \frac{(\tan\delta)_t}{(\tan\delta)_{t0}} \tag{6}$$

Or, in terms of G' and G", equation (6) can be rewritten as equation (7):

$$\dot{Q}_t = \dot{Q}_{t0}\left(\frac{G'_t}{G'_{t0}}\right)^{m-1} \frac{G''_t}{G''_{t0}} \tag{7}$$

It should be noted that in equations (6) and (7) it is implied that energy loss per cycle (Q) can be multiplied by a constant deformation rate (i.e. tire rotational frequency) to obtain Qdot.

Thus, the analysis starts with the ABAQUS structural analysis (see 102, FIG. 1) using the given elastic (neo-hookean) material properties at the reference temperature. A second ABAQUS analysis is run with all rubber materials stiffened by 20 percent. Corresponding energy dissipation runs (see 104, FIG. 1) follow with 1) baseline G" and 2) G" increased by 20 percent (implying that tan δ is held constant). The heat fluxes from the baseline energy dissipation run are saved. The deformation indices are calculated on an element basis from the two energy dissipation runs using equation (5). Temperatures are then obtained by running the ABAQUS thermal model (see 106, FIG. 1), which can be run in either steady state mode or transient mode, by updating heat flux using equation (7).

Figure 2:
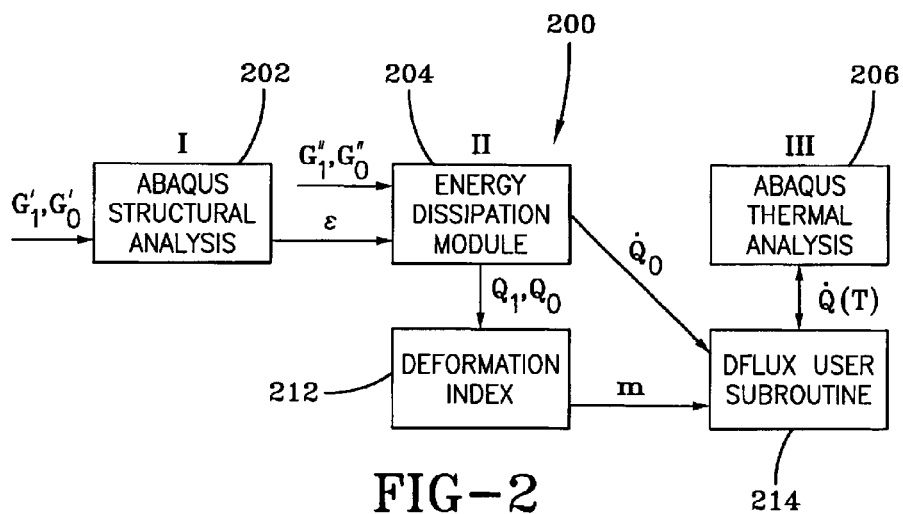
FIG. 2 is a flow chart of a technique for handling coupled heat generation analyses, according to the invention.

A flowchart for the deformation index method is shown in FIG. 2. The analysis 200 starts with the ABAQUS structural analysis 202 (compare 102) using the given elastic (neo-hookean) material properties. A second ABAQUS analysis is run with all rubber materials stiffened by 20 percent. Corresponding EDISS runs 204 (compare 104) follow with 1) baseline G" and 2) G" increased by 20 percent (implying that tan δ is held constant). The deformation indices are calculated 212 on an element basis from the two EDISS runs. The deformation indices are made available to an ABAQUS DFLUX subroutine 214, which also reads baseline material properties, heat fluxes, and time-temperature shifting constants. Temperatures are obtained by running the ABAQUS thermal wedge model 206 (compare 106) that references the DFLUX subroutine. The thermal analysis can be run in either steady state mode or transient mode.

The DFLUX Subroutine

An exemplary DFLUX subroutine is as follows:

```
subroutine dflux(flux,sol,kstep,kinc,time,noel,npt,coords,
     1 jltyp, temp,press)
c
      include 'ABA_PARAM.INC'
c
```

-continued

```
            real*8 mp(2000), mpp(2000)
            dimension flux(2), time(2), coords(3)
            dimension nel(2000), di(2000), gp0(2000), gpp0(2000)
            dimension cl(2000), qdot(2000)
c
c      Get data on first increment
c
            if (kinc .eq. 1) call kinput(nel,di,qdot,cl,mp,mpp,gp0,gpp0,ie1)
c
c      Convert temperature to celsius
c
            tempc = .55555*(sol-32.)
c
            do 1000 i=1,iel
            if (noel .eq. nel(i)) then
c
c      For consistency, need to make sure all properties are computed
c      through the wlf, even the reference properties: need red freq at
c      tempc and at 30C
c
            alogat1= -c1(i)*(30.0 -25)/(150+30.0 -25)
            at1= 10**alogat1
            alogat = -c1(i)*(tempc-25)/(150+tempc-25)
            at = 10**alogat
c
c
c
            gpref = gp0(i)*(at1*10)**mp(i)
            gp = gp0(i)*(at *10)**mp(i)
            gppref = gpp0(i)*(at1*10)**mpp(i)
            gpp = gpp0(i)*(at*10)**mpp(i)
c
            tand1= gppref /gpref
            tand = gpp/gp
c           flux(1) = qdot(i) * (tand/tand1) * (gp/gpref)**di(i)
            flux(1) = qdot(i) * (gpp/gppref) * (gp/gpref)**(di(i)-1)
c
c     The following for "G" coupling only (inner loop only)
c           flux(1) = qdot(i) * (gpp /gppref)
            endif
1000        continue
            return
            end
            subroutine kinput (nel,di,qdot,cl,mp,mpp,gp0,gpp0,iel)
c
c     Program reads all pertinent data from fort.15 and also reports back
c     number of elements
c
c
            include 'ABA_PARAM.INC'
            real*8 mp(1), mpp(1)
            dimension nel(1), di(1), gp0(1), gpp0(1)
            dimension cl(1), qdot(1)
c
            open (unit=15,file='/hpc/TVET/t460g41/g302_therm/di_method/
       1props_30C/data',status='old')
c
            i = 1
    10      read (15,1000,end=999)   nel(i),di(i),qdot(i),cl(i),mp(i),mpp(i),
       1                             gp0(i),gpp0(i)
            ie1 = i
            i = i+1
            goto 10
    100 format(i8,2x,7(ell.4,2x))
    999 return
        end
```

A Simple Test Case

Figure 2B:
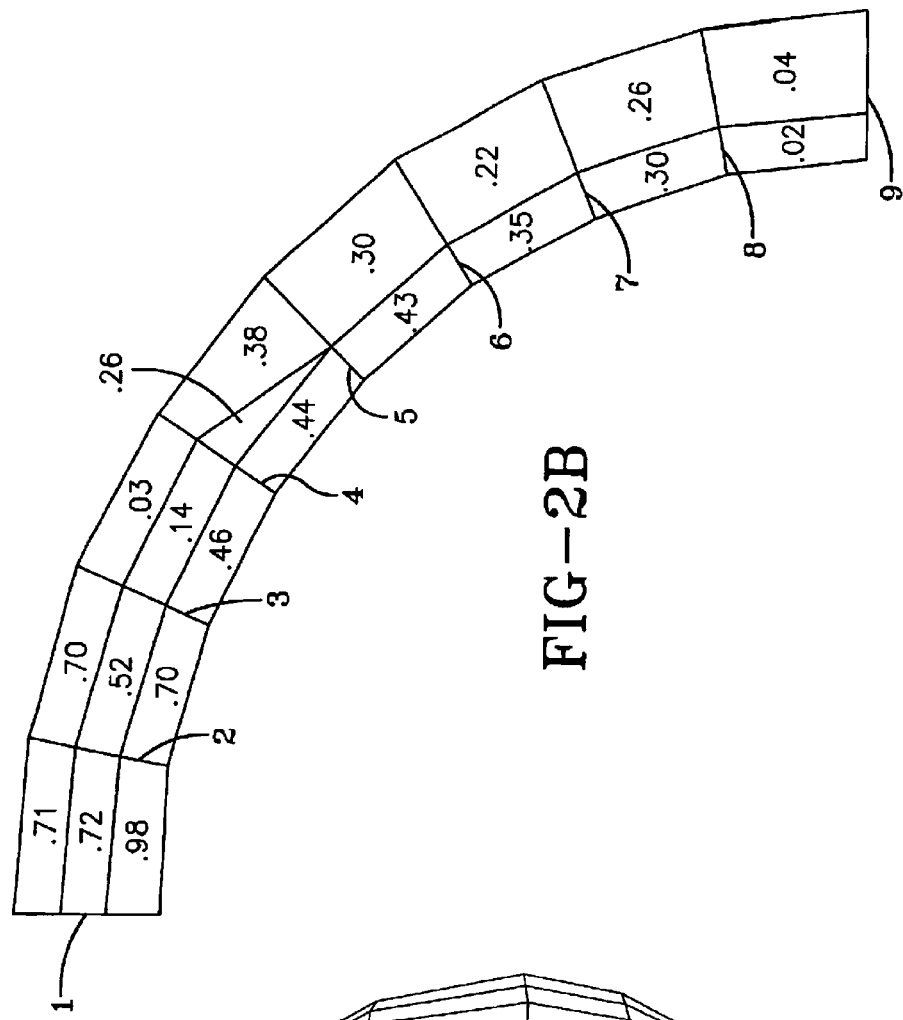
FIG. 2B is a graph of element deformation indices obtained from the test tire of FIG. 2A, according to the invention.
Figure 2A:
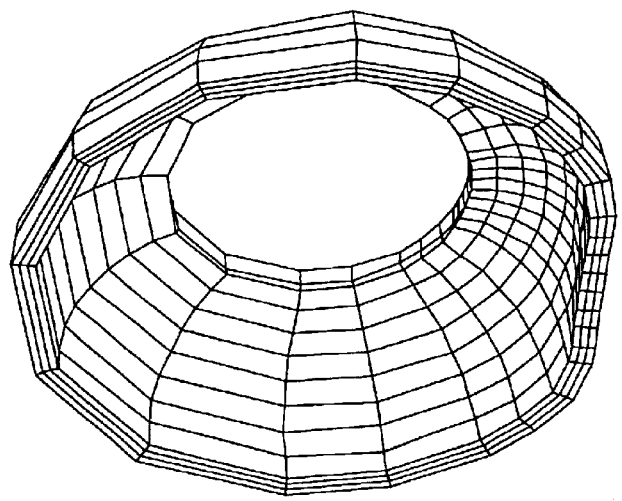
FIG. 2A is a 3D, wire frame representation of a simple test tire in a deflected state, such as output by an FEA program, according to the invention.

A test case was devised to evaluate the deformation index method of the present invention using a simple "tire-like" model ("test tire") having relatively few degrees of freedom. FIG. 2A illustrates half of the test tire (one side of the equatorial plane) in a load-deflected state. FIG. 2B illustrates 9 positions (labeled 1 through 9) from the crown to the bead of the test tire. As best viewed in the cross-sectional representation of FIG. 2B, the simple test tire has 20 elements in a given circumferential section (wedge sector).

Conventional Method—Steady State

Simulation of the structure load deflection was first run using ABAQUS (see module 104, FIG. 1) with all material properties initialized at room temperature. An energy dissipation analysis (see module 104, FIG. 1) was run at 20 mph (an arbitrarily selected, yet relevant speed for the tire) to obtain an element-by-element energy dissipation report. A file containing the element energy dissipation rates (heat fluxes) was requested for later use in the thermal analysis. The load deflection and energy dissipation analyses were then repeated with all rubber materials stiffened by 20 percent (an arbitrarily selected, yet relevant amount which is non-trivial yet not so large as to be meaningless) holding tan δ constant, from which the element deformation indices (shown in FIG. 2B) were determined from equation (5) for later use in demonstrating the deformation index method.

For example, the three elements near the crown of the tire (between positions 1 and 2 in FIG. 2B) exhibited element deformation indices of 0.71, 0.72, and 0.98, from outside of the tire to the inside of the tire, respectively. The indices shown in FIG. 2B range from 0.02 to 0.98 (from approximately 0 to approximately +1).

A thermal model of the tire was then prepared by extracting a 1-degree wedge sector from the 3D model to simulate an axisymmetric analysis. Appropriate thermal material properties, surface film coefficients, and boundary conditions were applied to the model. The body (heat) fluxes from the original energy dissipation run (see 104, FIG. 1) were applied and a conventional "uncoupled" steady state heat transfer analysis was obtained using ABAQUS. The results of the uncoupled analysis are shown in FIG. 3.

Next, the energy dissipation loop (see 108, FIG. 1) analysis was used to update the rubber loss modulus $G''$ for temperature. The loop was terminated when successive iterations showed that corresponding nodal temperatures changed by no more than one degree ($\Delta T_t$). (This required fewer than ten energy dissipation loop cycles.) The results, running the energy dissipation loop only, are shown in FIG. 3.

Next, the structural analysis loop (see 110, FIG. 1) was invoked by re-applying the temperatures from the converged energy dissipation loop computations to the tire structural model, thereby correcting the elastic material properties ($G'$) for temperature. The structural analysis loop was run until the corresponding nodal temperatures changed by no more than one degree ($\Delta T_o$). (This required three iterations of the structural loop.) The final result, running both the structural and the energy dissipation loop, are shown in FIG. 3, and is analogous to the "fully-coupled" loop analysis.

Figure 3:
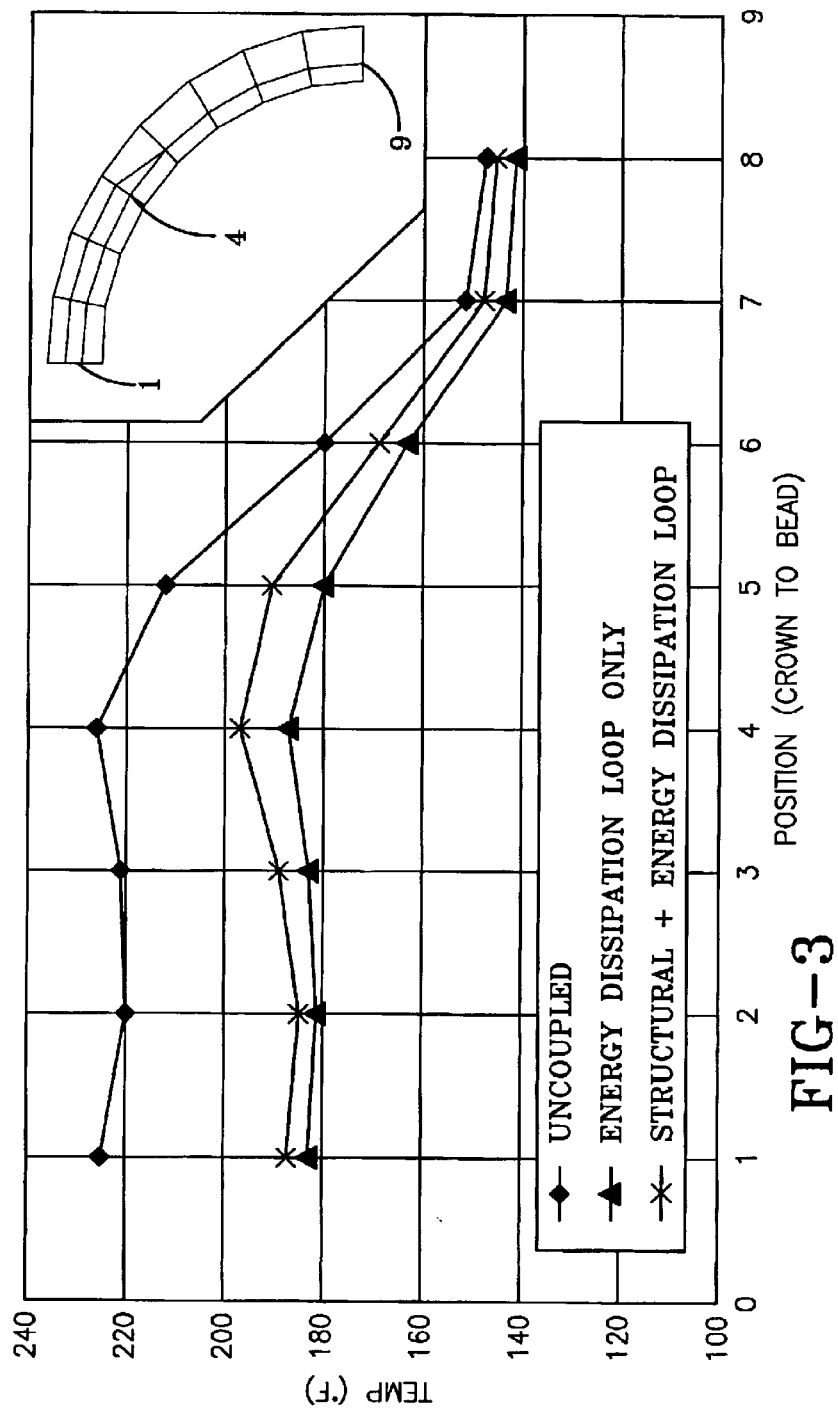
FIG. 3 is a graph showing the effects of temperature coupling for the tire of FIG. 2A using the conventional, prior art, method of analysis, according to the invention.

FIG. 3 shows a plot of steady state temperature distribution along a line of elements (between positions 0 and 9) from crown-to-bead in the tire cross-section with results obtained from the above-described uncoupled analysis, energy dissipation loop analysis, and fully-coupled loop analysis. These values were saved for comparison against the deformation index techniques of the present invention. It is readily observed in FIG. 3 that the temperatures are at a maximum in the crown area (e.g., positions 1–4), taper off in the sidewall area (positions 4–7), and are at a minimum in the bead area (position 8). Highest temperatures are seen for the open loop (uncoupled) analysis. When the rubber loss modulus $G''$ is corrected for temperature (energy dissipation loop 108), the temperatures drop significantly because the rubber loss modulus $G''$ decreases with increasing temperature. When the storage modulus $G'$ is corrected for temperature (structural+energy dissipation loop), the temperatures are higher than those corresponding to the energy dissipation loop case because the storage modulus $G'$ also decreases with increasing temperatures, causing the strains to increase.

Deformation Index Method—Steady State Analysis

Using the same steady state heat transfer model, an ABAQUS DFLUX user subroutine was written to express element heat flux as a function of temperature. The DFLUX subroutine accepts current element temperature at the given solution increment and outputs the resulting element heat flux. Algebraic expressions for $G'$ and $G''$ as a function of temperature are coded into the subroutine The body (heat) flux is calculated from the local deformation index and the current $G'$ and $G''$ using equation (7). The analysis was run three ways—namely:

a. uncoupled—identical to the first step in the conventional method, without the DFLUX subroutine—analogous to open loop b. with coupling applied to only $G''$—analogous to the energy dissipation (inner) loop only, and c. with coupling applied to both $G'$ and $G''$—analogous to the energy dissipation (inner) loop plus the structural analysis (outer) loop.

For b. (with coupling applied to only $G''$), the value of the storage modulus $G'$ was fixed at its room temperature value. All three cases were run just using equation (7) and using only the ABAQUS heat transfer analysis without iterative looping.

Figure 4:
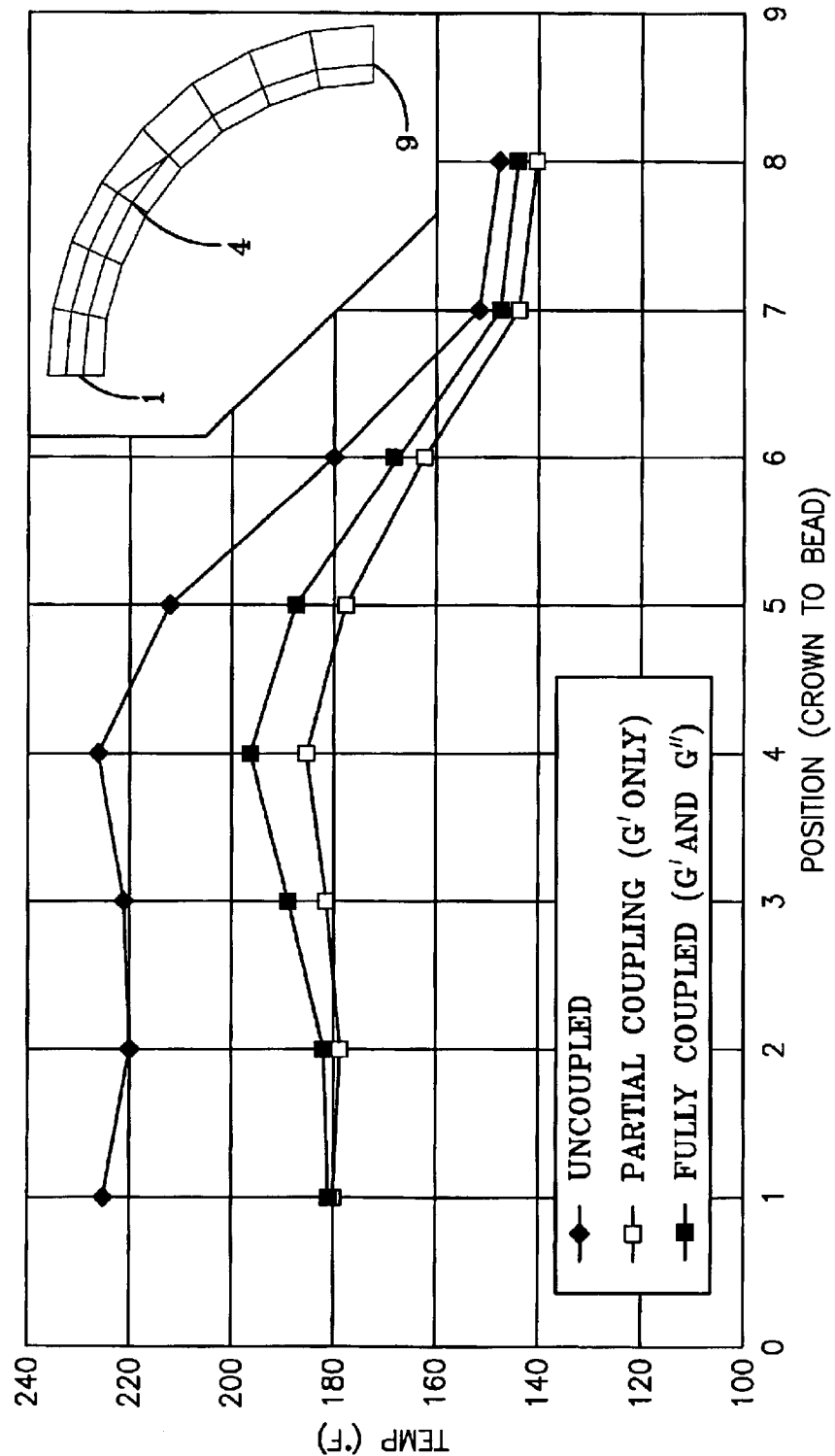
FIG. 4 is a graph showing the effects of temperature coupling for the tire of FIG. 2A using the deformation index method of analysis, according to the invention.

FIG. 4 shows a plot analogous to that of FIG. 3 for the deformation index method of the present invention. The results are in agreement with the conventional method, and demonstrate that the non-iterative deformation index method generates results approximately equivalent to the fully-coupled loop method for the test case shown. However, being non-iterative, these results can be obtained much more quickly.

The simple non-iterative deformation index method of the present invention yields results that are virtually the same as the results obtained by the iterative "looping" approach with a significant (e.g., 52 percent) reduction in total CPU (computation) time for steady state analysis.

Deformation Index Method—Transient Analysis

In order to demonstrate that the subroutine also works for a transient analysis, computations were performed on the same model, but this time invoking the ABAQUS transient heat transfer procedure. Temperatures were initialized to 86 degrees F. (30 degrees C.) at the beginning of the analysis. The analysis was carried out to a final solution time of 1.5 hours. Only minor changes were required in the ABAQUS input file. Required thermal heat capacities for the materials had already been specified (but not actually used) in the steady state analysis.

Figure 5:
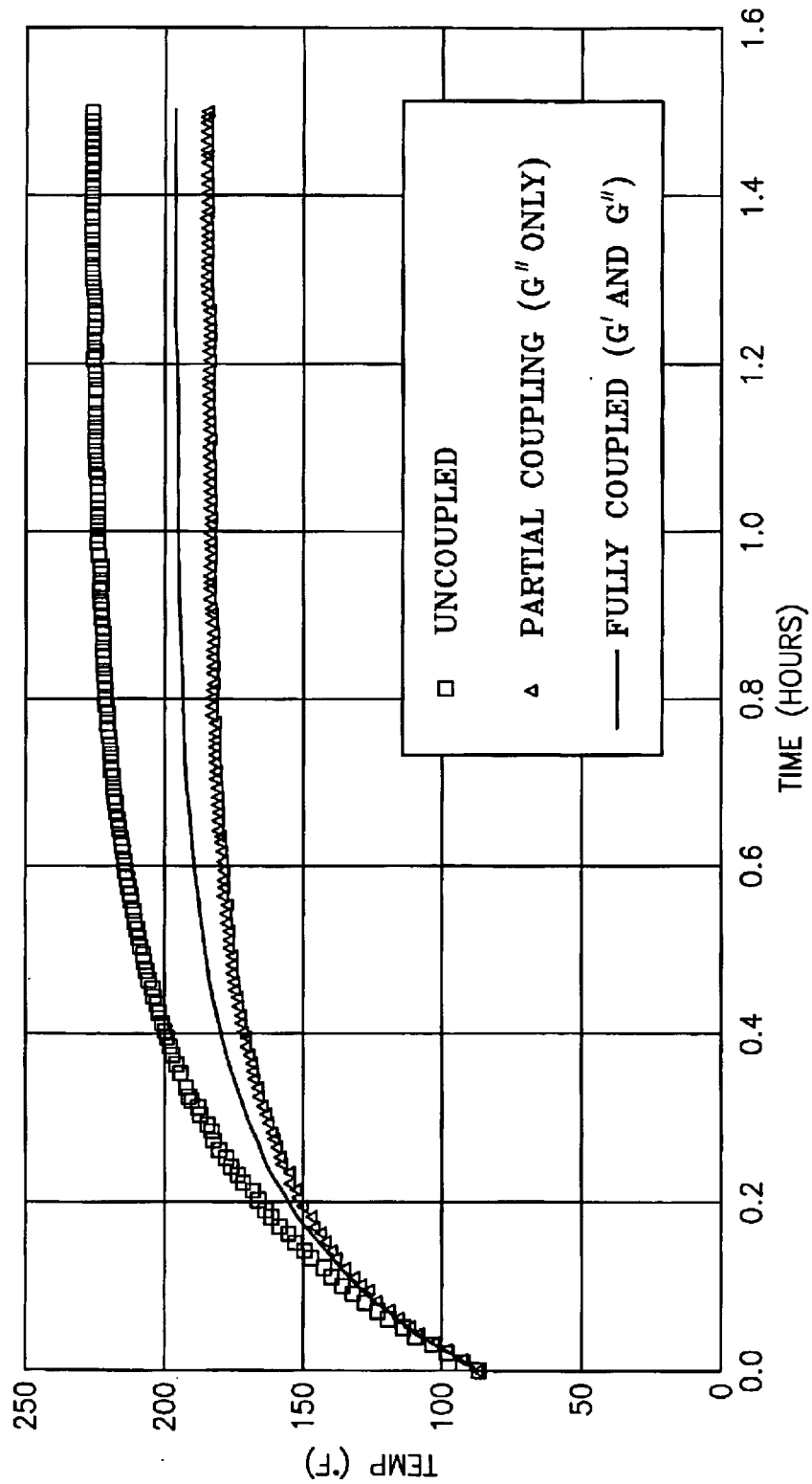
FIG. 5 is a graph showing transient temperatures at a location on the test tire of FIG. 2A using the deformation index method of analysis, according to the invention.

FIG. 5 shows transient temperatures at position 4 for a) the uncoupled analysis, b) coupling applied to $G''$ only, and c) the fully-coupled analysis. Temperatures after 1.5 hours correspond to the steady state values shown in FIG. 4 at position 4, as would be expected. It may therefore be concluded that the method works as expected for transient as well as steady state problems.

Summary of Advantages of the Deformation Index Method for Temperature Prediction Over Prior Art For the simple test case demonstrated, the non-iterative deformation index technique of the present invention gives results that are in agreement with results obtained by the iterative "fully-coupled loop" approach.

The deformation index concept can therefore effectively be used to simplify the coupled thermomechanical analysis of a rolling tire for the calculation of energy loss and temperature distribution in the tire.

Advantages of the deformation index method of the present invention over the iterative looping method of the prior art include:

1. The simple non-iterative deformation index method gives results that are virtually the same as the results obtained by the iterative "looping" approach with a significant reduction in total computing (cpu) time for steady state analysis.

2. The deformation index method is well suited for transient analysis. The inner and outer loop coupled technique is not practical for transient analysis.

3. Effects of coupling can be explained in terms of the deformation index (m). When m=1 (pure strain control), heat generation is affected only by G" and the resulting heat generation rate decreases with increasing temperature. For values of m less than 1, heat generation is also affected by G', resulting in higher strains that increase the heat generation rate with increasing temperature. The latter case corresponds to required inner and outer loop computations if the deformation index method is not used.
4. The deformation index method provides an efficient means of evaluating the relative importance of "outer loop" and "inner loop" coupling. In the example shown, the G" coupling was found to be more significant than the G' coupling due to the predominance of energy and strain control. However, if stress control were more prevalent, the G' coupling effect would be more significant.
5. Rolling resistance is affected by material temperature dependence. In the test tire, computed "open loop" rolling resistance was 58 lb. with all material properties at 86F. (30C.). When G" was corrected for temperature, rolling resistance dropped to 36 lb. When both G" and G' were corrected for temperature, rolling resistance (RR) was 40 lb.

A typical manner in which the deformation index method can be used is as follows:

Step 1. obtain average component deformation indices for the tire of interest at the required inflation and load;

Step 2. from the baseline EDISS report, identify the top five component contributors to energy loss;

Step 3. from the corresponding deformation indices, determine if the components are primarily under stress, strain or energy control;

Step 4. select an alternate material, as follows:
if stress control, decrease tan $\delta$/G'
if energy control, decrease tan $\delta$
if strain control, decrease G"

Step 5. Compute the energy loss with the alternate material, using equation (6).

Step 6. Sum the total energy loss over all components to compute improvement in rolling resistance (RR).

Estimating Effects of Compound Changes on Tire Temperature Distribution Using the Deformation Index There has been described, hereinabove, a method for solving coupled heat generation problems using the deformation index. This aspect of the invention builds on the ideas previously presented and describes a method for readily evaluating the effects of compound changes on tire temperatures using only the thermal finite element model of the tire. The method is based on the premise that element heat generation rate can be prorated for different materials if the deformation index and respective material properties are known. As discussed hereinabove, an ABAQUS DFLUX user subroutine is used to link element body (heat) flux (heat generation rate) to local temperature through a simple expression involving the deformation index and the compound storage and loss moduli (G' and G" respectively). The method can be used for either steady state or transient analysis.

The deformation index approach to tire thermal modeling provides an easy means to evaluate the impact of a material change on tire running temperatures. After initial model set-up, only the thermal finite element analysis (steady state or transient) needs to be re-run to evaluate a compound change. The resulting model (including data preparation) takes only a few minutes to run.

The objective of this aspect of the invention is to describe a method for estimating effects of compound changes on energy dissipation and tire temperature distribution using the deformation index method described hereinabove. The deformation index method described hereinabove is a method for solving coupled heat generation analyses using the deformation index. "Coupling" is loosely defined as the temperature dependence of compound storage and loss moduli (G' and G") and the respective interacting effects on tire structural and hysteretic response. Incorporation of coupling was found to be critically important for obtaining a realistic energy dissipation and tire temperature distribution. As described hereinabove, tire temperatures can be computed two ways, namely 1) by iteratively recycling the updated G' and G" back into the tire structural and energy loss models (the "looping" method), and 2) by using the deformation index approach, in which the effect of coupling is achieved by updating the element heat flux in the tire thermal model according to the following equation (8, same as equation (7), above):

$$\dot{Q}_t = \dot{Q}_{t0}\left(\frac{G'_t}{G'_{t0}}\right)^{m-1} \frac{G''_t}{G''_{t0}} \qquad (8)$$

where,
$Q_t$=Element body (heat) flux at temperature t
$Q_{t0}$=Element body (heat) flux at reference temperature $t_0$
$G'_t$, $G''_t$=Storage and loss moduli at temperature t
$G'_{t0}$, $G''_{t0}$=Storage and loss moduli at temperature $t_0$
m=Deformation index.

Equation (8) is handled in ABAQUS with the use of the DFLUX user subroutine, which accepts current temperature as input and computes heat flux as output. Within the subroutine, storage and loss moduli are computed at any temperature, as an example, using a "Power Law" fit of material data at two temperatures and two frequencies using the following equations (9, 10, 11):

$$G'_t = G'_0 (a_T f)^{p'} \qquad (9)$$

$$G''_t = G''_0 (a_T f)^{p''} \qquad (10)$$

$$\log a_T = -C_i\left(\frac{t - T_0}{C_2 + t - T_0}\right) \qquad (11)$$

where
$G'_0$, $G''_0$=Power law intercepts
p', p"=Power law slopes
$C_1$, $C_2$=WLF shift coefficients
f=Frequency (10 Hz assumed)
$T_0$="Fitting" temperature (25C.)

The power law constants can be readily obtained using the time-temperature superposition data reduction method. WLF is the time-temperature superposition equation in J. D. Ferry, "Viscoelastic Propertiew of Polymers," p375, Wiley, New York, 1970.

As discussed hereinabove, the "looping" method of the prior art and the deformation index method of the present invention yield results that are in close agreement for steady state analyses. In addition, it was found that the deformation index method of the present invention has an advantage for transient analysis, as looping is not required at each time step.

Assessing Effects of Compound Changes:

Equation (8) is general in that it simply "prorates" the reference heat flux to a "new" heat flux given that the deformation index and respective material properties are known. The reference heat flux is that which corresponds to the heat flux computed in the "baseline" analysis with all materials at the reference temperature (86 degrees F., 30 degrees C.).

In order to change materials, examination of equation (8) indicates that the body (heat) flux ($Q_{r0}$) and material properties ($G'_{r0}$, $G''_{r0}$) made available to the DFLUX subroutine need to be changed to correspond to the new material. This can be handled outside of the DFLUX subroutine with a little extra manipulation in the data preparation program using the following equation (12):

$$\dot{Q}_{t0(new)} = \dot{Q}_{t0(old)} \left( \frac{G'_{t0(new)}}{G'_{t0(old)}} \right)^{m-1} \frac{G''_{t0(new)}}{G''_{t0(old)}} \quad (12)$$

In equation (12), the material properties are given at the respective reference temperature conditions. The data preparation program creates a new file containing new body (heat) fluxes and properties for the new materials. The file is accessed by the DFLUX subroutine.

Figure 6:
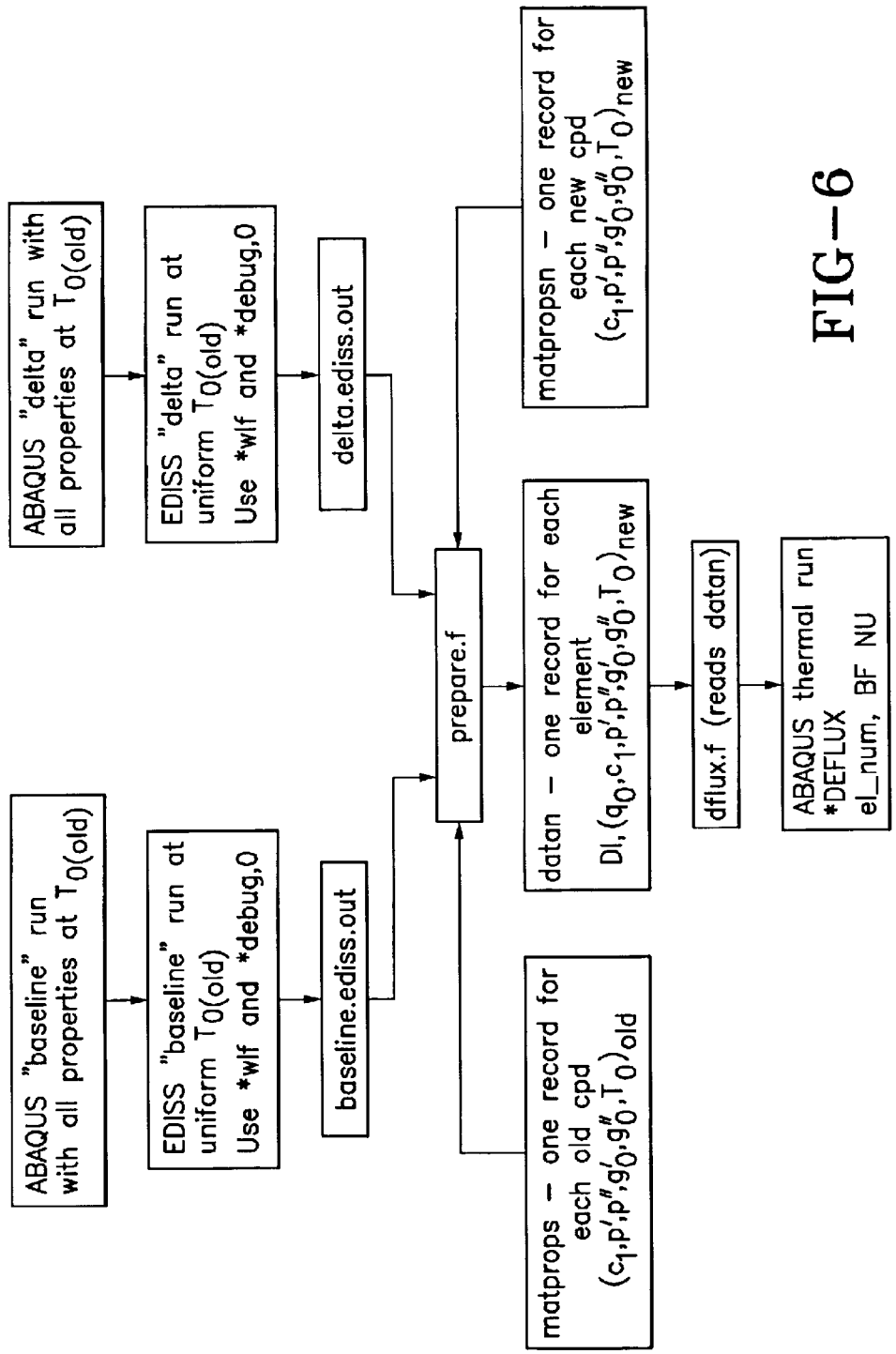
FIG. 6 is a flow chart of a technique for estimating effects of compound changes on tire temperature distribution, according to the invention.
Figure 7:
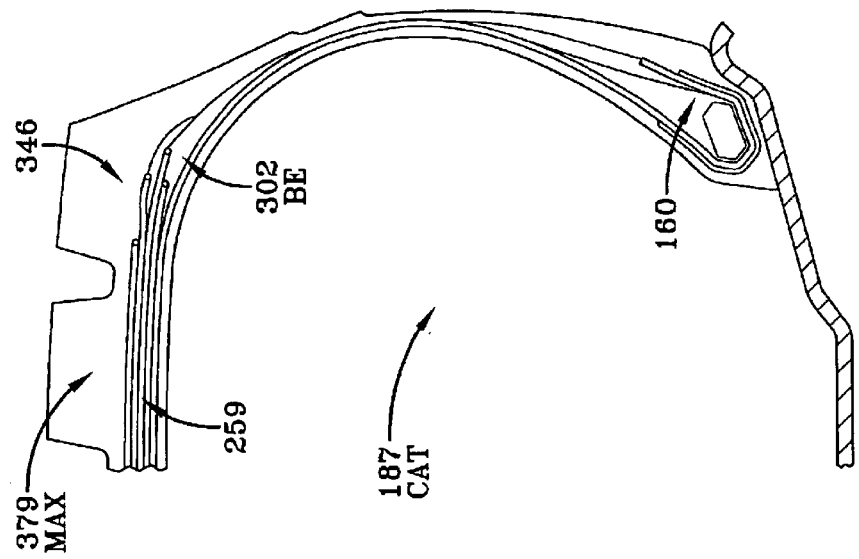
FIG. 7 is a cross section of half a tire showing the differences in the tire temperatures for compound A.
Figure 8:
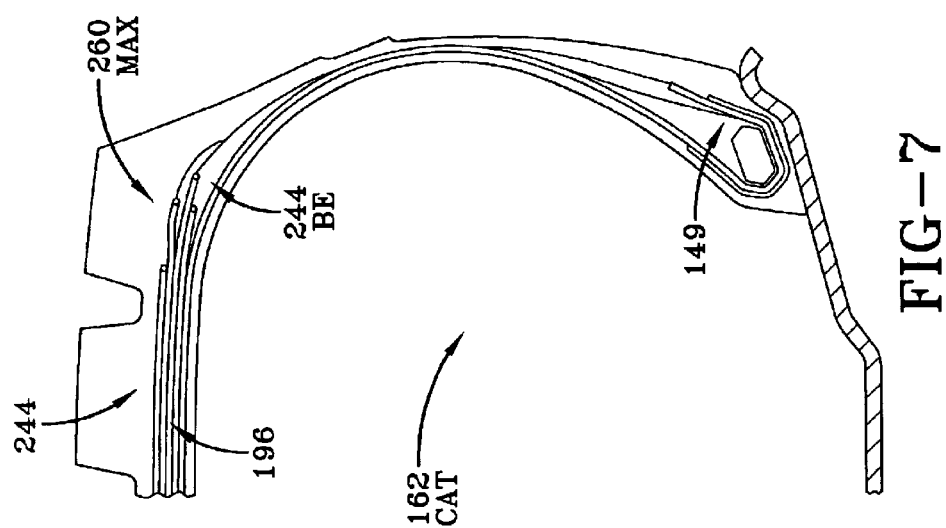
FIG. 8 is a cross section of half a tire showing the differences in the tire temperatures for compound B.

Using the above procedure enables the ability to assess the effects of compound changes on tire operating temperature by simply re-running the thermal finite element analysis with the new compound (typically a process that takes only a few minutes). The resulting process is shown in the flowchart of FIG. 6. The method is explained using the following examples with an 295/75R22.5 RMT tire model (5675 lb., 117 psi, 50 mph). Calculations are demonstrated for a change in tread compound. Film coefficients and thermal properties of the materials are unchanged. The table below gives material properties (power law constants) for a series of arbitrary tread compound materials that represents a wide range of compound properties.

| Tread Compound | C1 | $G'_0$ (psi) | $G''_0$ (psi) | p' | p" |
|---|---|---|---|---|---|
| A | 13.13 | 186.7 | 28.76 | .0219 | .0839 |
| B | 18.85 | 270.6 | 71.6 | .0332 | .0504 |
| C | 10.28 | 207.3 | 45.2 | .0448 | .0971 |
| D | 12.91 | 247.5 | 46.7 | .0221 | .0767 |

Results (FIGS. 7, 8, 9 and 10) showed tread compound B running the hottest and tread compound A running the coolest. It was also observed that the belt edge running temperature, which has been found to be critically important for belt durability performance, changes significantly from 244 degrees F. (118 degrees C.) for the coolest tread compound A, to 302 degrees F. (150 degrees C.) for the hottest tread compound B. It was also interesting to note that depending on the tread compound, the hottest portion of the tire may either be at the shoulder or at the tire centerline.

Comparison of the "Prorating" Method to the Full Method

Figure 14:
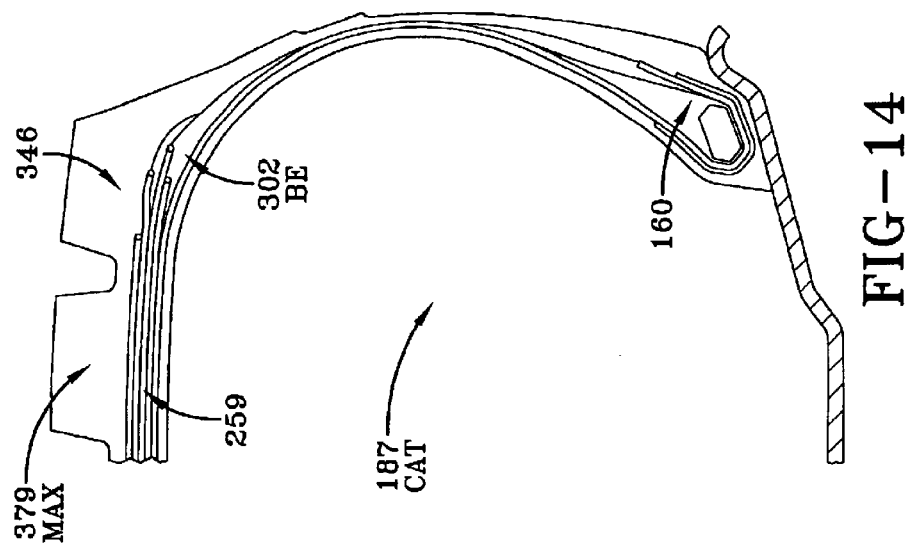
FIG. 14 is a cross section of half a tire showing the differences in the tire temperatures using a prorating method for compound B.
Figure 13:
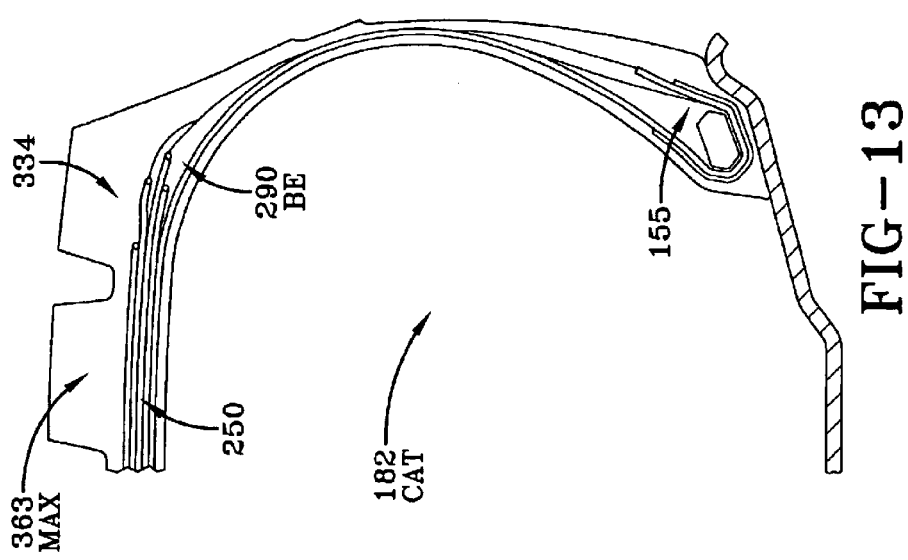
FIG. 13 is a cross section of half a tire showing the differences in the tire temperatures using a full method for compound B.

In order to check the validity of the "prorating" method, the technique was applied to a tire model. Two cases were tested. The tread compound was changed from "A" to "C", and from "A" to "B" (FIGS. 13 and 14). Temperatures were computed two ways, namely 1) by re-running the tire structural finite element analyses with the new materials according to the original process using the deformation index ("full method"), and 2) by using the modified process of FIG. 6 ("prorating method").

Agreement was very good for tread compound C with temperatures differing by at most 4 degrees F. For tread compound B, agreement was still good but with slightly greater deviation (16 degrees F.). There are believed to be two possible explanations are for the deviation. First, it can be noted that the adjustment factor in the prorating method considers only the temperature effect on the material properties, not the frequency effect. In the prorating method, all moduli are evaluated at 10 Hz, not at the dominant frequency seen by the individual elements as done by EDISS in the full method. The result is a small difference in the magnitude of the heat fluxes. Second, the deformation indices are slightly material dependent. Because compound B has a greater compound departure in stiffness than compound C, the deformation indices are affected more for compound B, and thus the larger deviation in temperature. This discrepancy is probably not an issue for comparing the effect of different compounds on temperature distribution.

It has therefore been demonstrated that:

The deformation index approach to tire thermal modeling provides an easy means to evaluate the impact of a material change on tire running temperatures. After initial model set-up, only the thermal finite element analysis (steady state or transient) needs to be re-run to evaluate a compound change. The resulting model (including data preparation) takes only a few minutes to run.

Comparison of the "full" deformation index method to the "prorating" method of computing temperatures shows that resulting temperatures are in reasonable agreement.

Demonstration of the technique on four different tread compounds gives results that are reasonable.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. A method for performing a computerized thermomechanical analysis of a tire design at a desired inflation and load to be used to obtain a desired temperature destribution in a rolling tire, comprising:

creating a finite element analysis model of the tire having a first plurality of elements, the first plurality of elements of the model comprising a plurality of tire compounds (TC) having elastic material properties (G') and loss moduli (G");

performing a baseline computer run, comprising performing a structural analysis, at temperature $t_0$, of the first plurality of elements using baseline elastic material properties ($G'_0$), performing an energy dissipation analysis using baseline loss moduli ($G''_0$), calculating energy dissipated per unit volume of the first plurality of element per cycle ($Q_0$);

using the computer, performing a perturbation run, comprising performing the structural analysis, at temperature $t_0$, of the first plurality of elements using perturbation elastic material properties ($G'_1$) of first plurality of tire compounds, performing the energy dissipation analysis using perturbation loss moduli ($G''_1$), calculating energy dissipated per unit volume of the first plurality of elements per cycle ($Q_1$);

calculating deformation indices (m) for the first plurality of elements by the following equation:

$$m = \frac{\log(Q_1/Q_0) - \log(G_1''/G_0'')}{\log(G_1'/G_0')} + 1; \text{ and}$$

performing a thermal finite element analysis run to obtain temperature distribution and energy loss in the tire with the first plurality of elements comprising a plurality of tire compounds while updating the element heat fluxes in a tire finite element thermal model according to an equation:

$$\dot{Q}_t = \dot{Q}_{t0}\left(\frac{G_t'}{G_{t0}'}\right)^{m-1}\frac{G_t''}{G_{t0}''}$$

where, $\dot{Q}_t$=Element heat flux at temperature t $\dot{Q}_{t0}$=Element heat flux at reference temperature $t_0$ $G_t'$, $G_t''$=Storage and loss moduli at temperature t $G_{t0}'$, $G_{t0}''$=Storage and loss moduli at temperature $t_0$ m=Deformation index repeating the structural and thermal analysis runs with at least a second plurality of elements of a plurality of tire compounds; and selecting the plurality of elements of a plurality of tire compounds with a more desirable temperature distribution.

2. A method, according to claim 1, further comprising:

analyzing steady state and transient temperature in a running tire.

3. A method, according to claim 1, further comprising:

analyzing steady state and transient rolling loss in a running tire.

4. A method, according to claim 1, wherein the elastic material properties (G') are shear storage moduli.

5. A method, according to claim 1, wherein in the perturbation run, the tire compounds (TC) are stiffened by a small amount.

6. A method, according to claim 1, wherein in the perturbation run, the tire compounds (TC) are stiffened by at least 10 percent.

7. A method, according to claim 1, further comprising:

deriving temperatures for the elements from the deformation indices of the elements.

8. A method, according to claim 7, further comprising:

deriving temperatures for the elements from material properties, body (heat) fluxes and time-temperature shifting constants.

9. A method, according to claim 8, further comprising:

using the method to evaluate the impact of a tire compound change on tire running temperatures.

10. A method for performing a computerized thermomechanical analysis of a tire design at a desired inflation and load to be used to obtain a desired temperature destribution in a rolling tire, comprising:

creating a finite element analysis model of the tire having a first plurality of elements, the first plurality of elements of the model comprising a plurality of tire compound (TC) having elastic material properties (G') and loss moduli (G");

performing a baseline computer run, comprising performing a structural analysis, at temperature $t_{0(old)}$, of the first plurality of elements using baseline elastic material properties ($G_0'$), performing an energy dissipation analysis using baseline loss moduli ($G_0''$), calculating energy dissipated per unit volume of the first plurality of element per cycle ($Q_0$);

using the computer, performing a perturbation run, comprising performing the structural analysis at temperature $t_{0(old)}$, of the first plurality of elements using perturbation elastic material properties ($G_1'$), of first plurality of tire compounds, performing the energy dissipation analysis using perturbation loss moduli ($G_1''$), calculating energy dissipated per unit volume of the first plurality of elements per cycle ($Q_t$);

calculating deformation indices (m) for the first plurality of elements by the following equation:

$$m = \frac{\log(Q_1/Q_0) - \log(G_1''/G_0'')}{\log(G_1'/G_0')} + 1; \text{ and}$$

performing a thermal finite element analysis run to obtain temperature destribution and energy loss in the tire with the first plurality of elements comprising a plurality of tire compounds while updating the element heat fluxes in a tire finite element thermal model according to the following equation:

$$\dot{Q}_{t(old)} = \dot{Q}_{t0(old)}\left(\frac{G_{t(old)}'}{G_{t0(old)}'}\right)^{m-1}\frac{G_{t0(old)}''}{G_{t0(old)}''}$$

where, $\dot{Q}_{t(old)}$=first plurality of elements heat flux at temperature $t_{(old)}$ $\dot{Q}_{t0(old)}$=first plurality of elements heat flux at reference temperature $t_{0(old)}$ $G_{t(old)}'$, $G_{t(old)}''$=first plurality of storage and loss moduli at temperature $t_{(old)}$ $G_{t0(old)}'$, $G_{t0(old)}''$=first plurality of storage and loss moduli at temperature $t_{0(old)}$ m=Deformation index;

repeating the thermal analysis runs with at least a second plurality of elements of a plurality of tire compounds; and performing a thermal finite element analysis run to obtain temperature destribution and energy loss in the tire with the second plurality of elements comprising a plurality of tire compounds while updating the element heat fluxes in a tire finite element thermal model according to the equations:

$$\dot{Q}_{t0(new)} = \dot{Q}_{t0(old)}\left(\frac{G_{t0(new)}'}{G_{t0(old)}'}\right)^{m-1}\frac{G_{t0(new)}''}{G_{t0(old)}''}$$

and $$\dot{Q}_{t(new)} = \dot{Q}_{t0(new)}\left(\frac{G_{t(new)}'}{G_{t0(new)}'}\right)^{m-1}\frac{G_{t(new)}''}{G_{t0(new)}''}$$

where, $\dot{Q}_{t(new)}$=second plurality of element heat flux at temperature $t_{(old)}$ $\dot{Q}_{t0(new)}$=second plurality element heat flux at reference temperature $t_{0(old)}$ $G_{t(new)}'$, $G_{t(new)}''$=second plurality of elements storage and loss moduli at temperature $t_{(new)}$ $G'_{r0(new)}$, $G''_{r0(new)}$ = second plurality of elements storage and loss moduli at temperature $t_{0(new)}$ and;

selecting the plurality of elements of a plurality of tire compounds with a more desirable temperature destribution.

11. A method, according to claim 10, further comprising:

obtaining average component deformation indices for a tire of interest at a required inflation and load;

from the baseline thermal analysis, identifying the top component contributors to energy loss;

from the corresponding deformation indices, determining if the components are primarily under stress, strain or energy control;

selecting an alternate material, as follows:
- if stress control, decrease $\tan \delta / G'$
- if energy control, decrease $\tan \delta$
- if strain control, decrease $G''$ computing the thermomechanically coupled energy loss rate with the alternate material, using the equation; and summing the total energy loss rate over all components to compute improvement in rolling resistance (RR).

12. A method, according to claim 10, further comprising:

creating a finite element analysis model of the tire having a plurality of elements, the elements of the model comprising a tire compound having elastic material properties (G') and loss moduli (G");

performing a baseline run, comprising performing a structural analysis of the elements using baseline elastic material properties ($G'_0$), calculating energy dissipated per unit volume of the element per cycle ($Q_0$);

performing a perturbation run, comprising performing the structural analysis of the elements using perturbation elastic material properties ($G'_1$), performing the energy dissipation analysis using perturbation loss moduli ($G''_1$), calculating energy dissipated per unit volume of the element per cycle ($Q_1$); and calculating deformation indices (m) for the element as a function of at least one of:

the ratios of the energy dissipations (Q) for the baseline and perturbation runs; and the ratios of elastic material properties (G') for the baseline and perturbation runs.

13. A method, according to claim 12, wherein the elastic material properties (G') are shear storage moduli.

14. A method, according to claim 12, wherein in the perturbation run, the tire compounds are stiffened by a small amount.

15. A method, according to claim 14, wherein in the perturbation run, the tire compounds are stiffened by at least 10 percent.

16. A method, according to claim 12, further comprising:

deriving temperatures for the elements from the deformation indices of the elements.

17. A method, according to claim 16, further comprising:

deriving temperatures for the elements from material properties, heat fluxes and time-temperature shifting constants.

18. A method, according to claim 17, further comprising:

using the method to evaluate the impact of a tire compound change on tire running temperatures.

* * * * *